US010104604B2

(12) United States Patent
Ma et al.

(10) Patent No.: US 10,104,604 B2
(45) Date of Patent: Oct. 16, 2018

(54) S9 ROAMING SESSION DESTINATION SELECTION

(71) Applicant: ALCATEL-LUCENT CANADA INC., Ottawa (CA)

(72) Inventors: Haiqing H. Ma, Ottawa (CA); Zhaoliang Z. Ding, Ottawa (CA)

(73) Assignee: ALCATEL LUCENT, Nozay (FR)

( * ) Notice: Subject to any disclaimer, the term of this patent is extended or adjusted under 35 U.S.C. 154(b) by 42 days.

(21) Appl. No.: 15/395,722

(22) Filed: Dec. 30, 2016

(65) Prior Publication Data

US 2018/0192362 A1    Jul. 5, 2018

(51) Int. Cl.
| | |
|---|---|
| H04W 4/00 | (2018.01) |
| H04W 48/18 | (2009.01) |
| H04L 29/08 | (2006.01) |
| H04L 12/46 | (2006.01) |
| H04W 76/15 | (2018.01) |

(52) U.S. Cl.
CPC ......... *H04W 48/18* (2013.01); *H04L 12/4633* (2013.01); *H04L 67/14* (2013.01); *H04W 76/15* (2018.02)

(58) Field of Classification Search
CPC ... H04W 48/18; H04W 76/15; H04W 76/025; H04L 12/4633; H04L 67/14
See application file for complete search history.

(56) References Cited

U.S. PATENT DOCUMENTS

| | | |
|---|---|---|
| 2004/0092276 A1 | 5/2004 | Dooley |
| 2012/0036257 A1 | 2/2012 | Mann |
| 2012/0102174 A1 | 4/2012 | Zhou |
| 2012/0106508 A1 | 5/2012 | Li |
| 2013/0097326 A1 | 4/2013 | Yeung et al. |
| 2013/0326061 A1 | 12/2013 | Li |

FOREIGN PATENT DOCUMENTS

WO    WO-2012155774 A1 * 11/2012 ............ H04M 15/66

OTHER PUBLICATIONS

"Digital cellular telecommunications system (Phase 2+); Universal Mobile Telecommunications System (UMTS); LTE; Policy and Charging Control (PCC) over S9 reference point; Stage 3"; 3GPP TS 29.215 version 9.9.0 Release 9; Jan. 2012 (Year: 2012).*
"3GPP TS 29.212 V11.6.0 (Sep. 2012)", 3rd Generation Partnership Project; Technical Specification Group Core Network and Terminals; Policy and Charging Control (PCC) Reference points (Release 11).

(Continued)

*Primary Examiner* — Afshawn M Towfighi
(74) *Attorney, Agent, or Firm* — Kramer Amado, P.C.

(57) ABSTRACT

Various embodiments relate to a method performed by a network node for creating a Diameter session, the method including: receiving an S9 session request message comprising an S9 session identifier (ID) and one or more subsession IDs; and for each said one or more subsession IDs, creating a Diameter session with a session ID comprising said S9 session ID and said respective S9 subsession ID. Embodiments can add IP address information the Diameter session and are suited to handling subsequent Rx messages without subscriber information.

20 Claims, 6 Drawing Sheets

(56) References Cited

OTHER PUBLICATIONS

"3GPP TS 29.213 V11.4.0 (Sep. 2012)", 3rd Generation Partnership Project; Technical Specification Group Core Network and Terminals; Policy and Charging Control (PCC) signalling flows and Quality of Service (QoS) parameter mapping (Release 11).

"3GPP TS 29.214 V11.5.0 (Jun. 2012)", 3rd Generation Partnership Project; Technical Specification Group Core Network and Terminals; Policy and Charging Control over Rx reference point (Release 11).

"3GPP TS 29.215 V11.5.0 (Jun. 2012)", 3rd Generation Partnership Project; Technical Specification Group Core Network and Terminals; Policy and Charging Control (PCC) over S9 reference point; Stage 3 (Release 11).

* cited by examiner

S9 ROAMING SESSION DESTINATION SELECTION

CROSS REFERENCE TO RELATED APPLICATIONS

The present application is related to co-pending United States Patent Application entitled "S9 Roaming Session Cleanup with S9 Connection Failure" (Ma et al.), filed concurrently herewith, the entire content of which is incorporated herein by reference.

FIELD OF INVENTION

The invention is directed to telecommunications networks and more specifically, to improved roaming session management in Evolved Packet Core (EPC) telecommunications networks.

BACKGROUND

In an effort to simplify the dual core approach of the, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable quality of experience (QoE) and charging a subscriber for their particular network activity The 3GPP generally describes the components of the EPC and their interactions with each other in a number of technical specifications. Specifically, 3GPP TS 29.212, 3GPP TS 29.213, 3GPP TS 29.214, and 3GPP TS 29.215 describe the Policy and Charging Rules Function (PCRF), Policy and Charging Enforcement Function (PCEF), Bearer Binding and Event Reporting Function (BBERF) of the EPC, and Policy and Charging Control (PCC) over S9 Reference Point. These specifications further provide some guidance as to how these elements interact in order to provide reliable data services and charge subscribers for use thereof.

A communications network of a network provider usually has a limited geographical range where it can provide communications services. Network subscribers usually subscribe to a single network. When a network subscriber is outside of the geographical range of the subscribed network, another network provider may provide network service to the subscriber, who is then considered a roaming subscriber in this visited network. The subscriber's home network and the visited network must negotiate in order to provide network service to the subscriber and correctly apportion the costs of the service. LTE networks use the S9 reference point to communicate between a visited PCRF (V-PCRF) node and a home PCRF (H_PCRF) node. The use of the S9 reference point can lead to some functional limitations in certain scenarios. Therefore, improvements to handling of Rx messages or IPCAN session messages without subscription IDs at a home-PCRF for roaming sessions would be highly desirable.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network node for creating a Diameter session. The method comprises: receiving an S9 session request message comprising an S9 session identifier (ID) and one or more subsession IDs; and for each the one or more subsession IDs, creating a Diameter session with a session ID comprising the S9 session ID and the respective S9 subsession ID.

Various alternative embodiments further comprise adding information from the S9 session request message related to the respective S9 subsession ID, to the Diameter session.

In various alternative embodiments, the information related to the respective S9 subsession ID comprises a first Internet Protocol (IP) address.

Various alternative embodiments further comprise adding internal routing information related to the respective S9 subsession ID.

In various alternative embodiments the internal routing information is determined by the network node as function of the first IP address.

In various alternative embodiments the network node comprises a policy and charging function node; and the internal routing information comprises an address for a policy server sub-system.

Various alternative embodiments further comprise: receiving from an application function (AF) an AF request message comprising a second IP address; and associating the AF request message with the Diameter session having the corresponding IP address.

Various alternative embodiments further comprise receiving an IPCAN session query message comprising a second IP address; and associating the IPCAN session query message with the Diameter session having the corresponding IP address.

Various alternative embodiments further comprise receiving an S9 subsession termination message; and terminating the Diameter session associated with the S9 subsession ID of the S9 subsession termination message.

Various alternative embodiments further comprise receiving an S9 session termination message; and terminating all of the Diameter sessions associated with the S9 session ID of the S9 session termination message.

Other embodiments of the invention provide a tangible and non-transitory machine-readable storage medium encoded with instructions for execution by network node for creating a Diameter session. The tangible and non-transitory machine-readable storage medium comprises instructions for: receiving an S9 session request message comprising an S9 session identifier (ID) and one or more subsession IDs; and for each the one or more subsession IDs, creating a Diameter session with a session ID comprising the S9 session ID and the respective S9 subsession ID.

BRIEF DESCRIPTION OF THE FIGURES

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Referring now to the drawings, in which like numerals refer to like components or steps, there are disclosed broad aspects of various exemplary embodiments.

Figure 1:
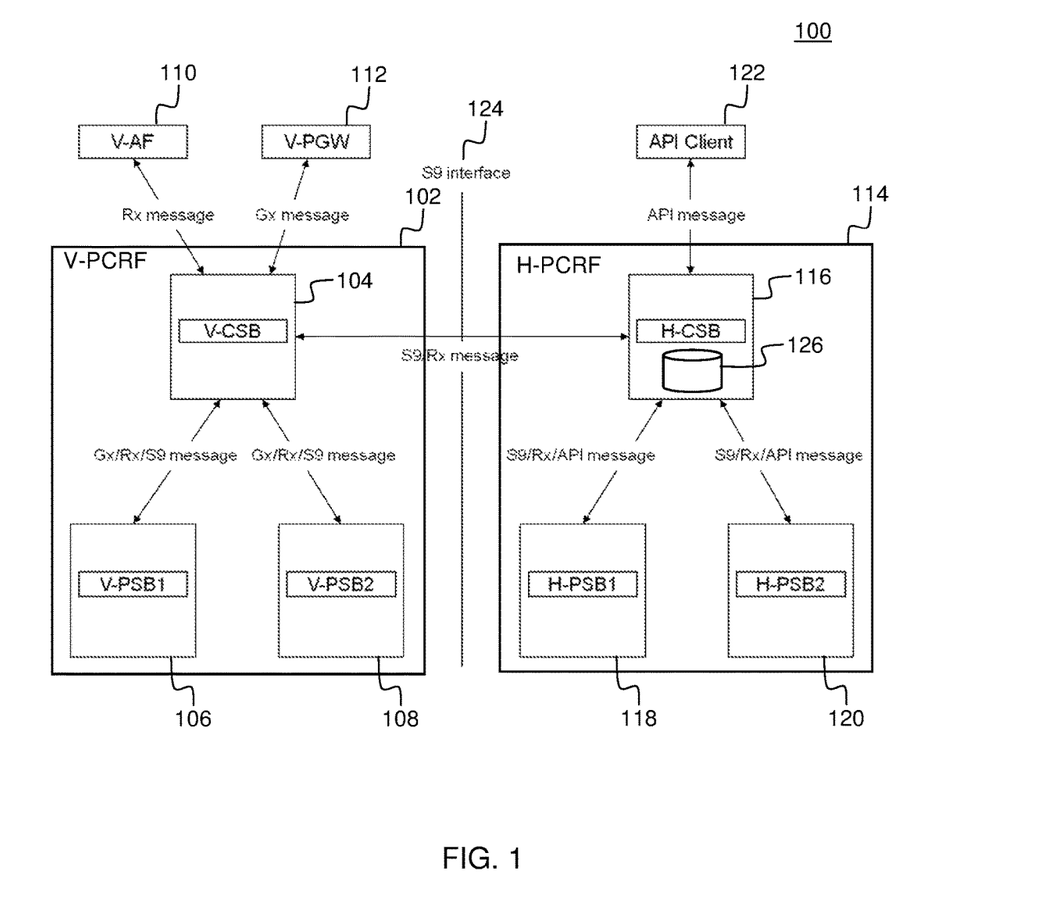
FIG. 1 illustrates a PCRF S9 roaming architecture.

FIG. 1 illustrates a Policy and Charging Rule Function (PCRF) S9 roaming architecture 100. In an advantageous embodiment of a PCRF node 102 or 114, message processing can be handled by a Common Service Blade (CSB) 104 or 116 which receives incoming communication session requests and routes these to multiple Policy Service Blades (PSBs) 106, 108 or 118, 120 which handle the policy control for the incoming communication sessions. Thus, one CSB can manage multiple PSBs. Sessions are created to track incoming messages based on the information in the incoming message, session IDs are used by CSB in order to route subsequent related messages to the correct PSB. In a roaming scenario, the home network is served by H-PCRF 114 connected via S9 reference point 124 to V-PCRF 102 on the visited network. H represents the home network and V represents the visited network. Incoming Gx messages can be received at V-CSB 104 at V-PCRF 102 through a Gx interface. Incoming Rx messages can be received at V-CSB 104 at V-PCRF 102 through an Rx interface. Gx messages and Rx messages as well as S9 messages can be routed by V-CSB 104 to V-PSB1 106 and V-PSB2 108. S9 interface 124 can carry S9 messages and Rx messages between V-CSB 104 at V-PCRF 102 and H-CSB 116 at PCRF 116. API Client 122 can handle Application Programming Interface (API) messages from a network operator in order to perform network management, which can be received at H-CSB 116. Database 126 stores session information indexed by a session key as will be described with reference to FIG. 3.

Figure 2:
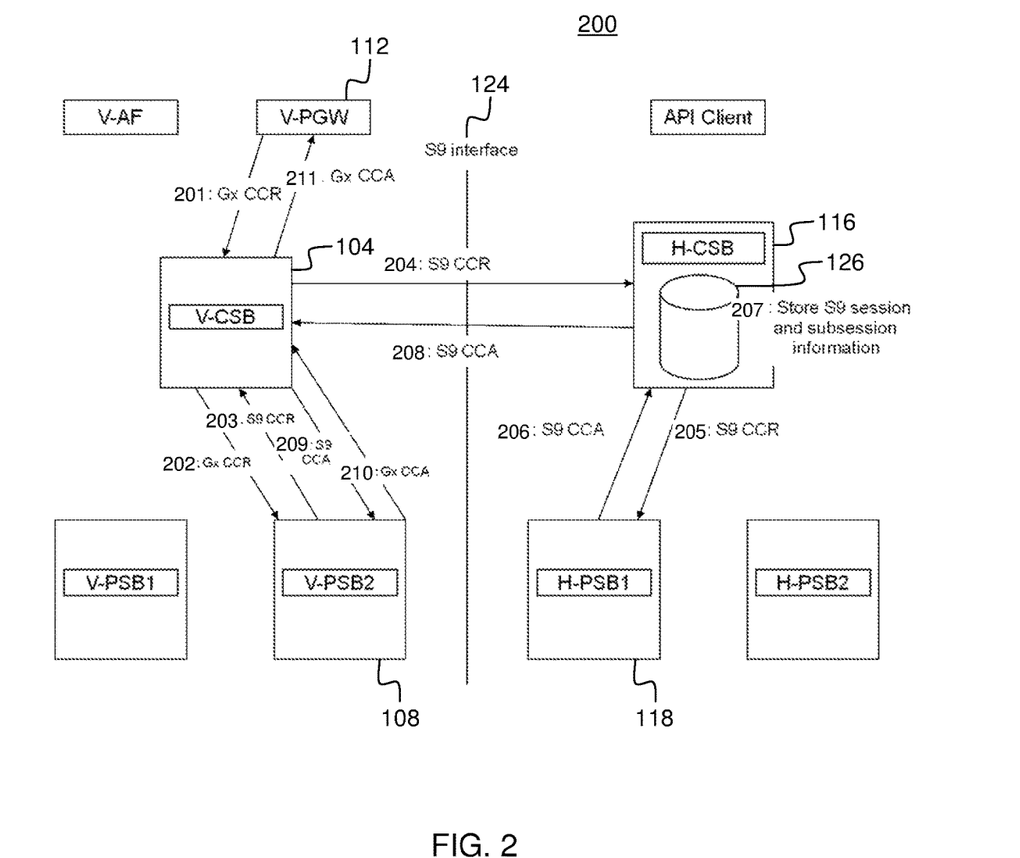
FIG. 2 illustrates an IPCAN session establishment message flow.

FIG. 2 illustrates an IPCAN session establishment message flow. V-CSB 104 receives Diameter Gx Credit Control Request (CCR) CCR message 201 representing a communication session for a roaming subscriber, from V-PGW 112 and creates an IPCAN session. V-CSB 104 then selects PSB based on the subscriber information in the message, in this case V-PSB2 108 is selected. V-CSB 104 then routes Gx CCR message 202 to V-PSB2 108 which converts the Gx message into an S9 message and returns S9 CCR message 203 which V-CSB 104 then forwards as S9 CCR message 204 via S9 interface 124 to H-CSB 116. Because the message is not a Gx message, H-CSB 116 cannot create an IPCAN session. Instead, H-CSB 116 creates a Diameter session using S9 session information and SP subsession information as will be explained in more detail with reference to FIG. 3. H-CSB 116 then routes the message as S9 CCR message 205 to H-PSB1 118. H-PSB1 118 resolves the policy control decisions and returns a Credit Control Answer (CCA) as S9 CCA message 206 which is forwarded to H-CSB 116 which then forwards the message as S9 CCA message 208 to V-CSB 104 via S9 interface 124. V-CSB 104 then routes the message as S9 CCA message 209 to V-PSB2 108 which converts the message back to a Gx format and returns it as Gx CCA message 210 to V-CSB 104 which then forwards it as Gx CCA message 211 to V-PGW 112.

Figure 3:
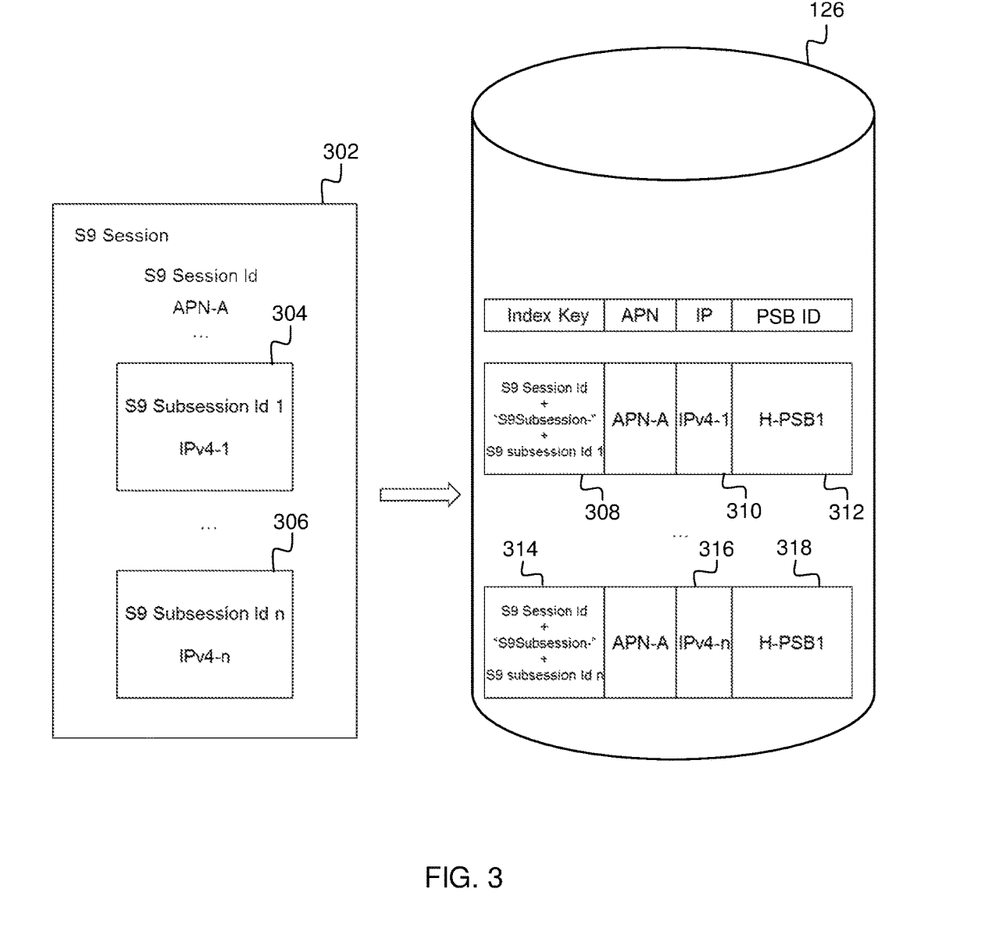
FIG. 3 illustrates a stored S9 data structure.

FIG. 3 illustrates a stored S9 data structure. S9 session creation message such as an S9 CCR message 302 contains an S9 session ID, Access Point Name (APN) and other data. One S9 session can contain multiple S9 subsessions 304, 306, each having an S9 subsession ID and an IP address of a subscriber's user equipment (UE) associated with the subsession. The IP address can be, for example, but not restricted to IPv4 or IPv6. H-CSB 116 stores the S9 session and S9 subsession information into the local database 126. In order to avoid duplicate session information, a separate entry is made for each subsession of the S9 session message. The data is stored with an index key 308 which combines both S9 session ID and S9 subsession ID. In one embodiment, the index key comprises S9 session ID concatenated with a label such as "subsession" and S9 subsession ID to form a unique index key. The data stored in the entry contains data from the S9 session level such as APN, and data from S9 subsession level like IPv4 310. H-CSB 116 assigns a PSB based on the subscriber's UE ID in the CCR message and the PSB ID is stored in the database entry as H-PSB1 312. The PSB ID or address or identifier is used to route subsequent messages related to the same session to the correct PSB. More generally, PSB can be referred to as a policy server subsystem and the PSB ID a s a policy server subsystem address. The entry is created when the S9 successful response message is received by H-CSB 116, and it is deleted when an S9 subsession termination message is received. Sometimes, the S9 session termination message doesn't contain the S9 subsession information, in which case, then all the S9 subsession entries belonging to the same S9 session will be removed.

Figure 4:
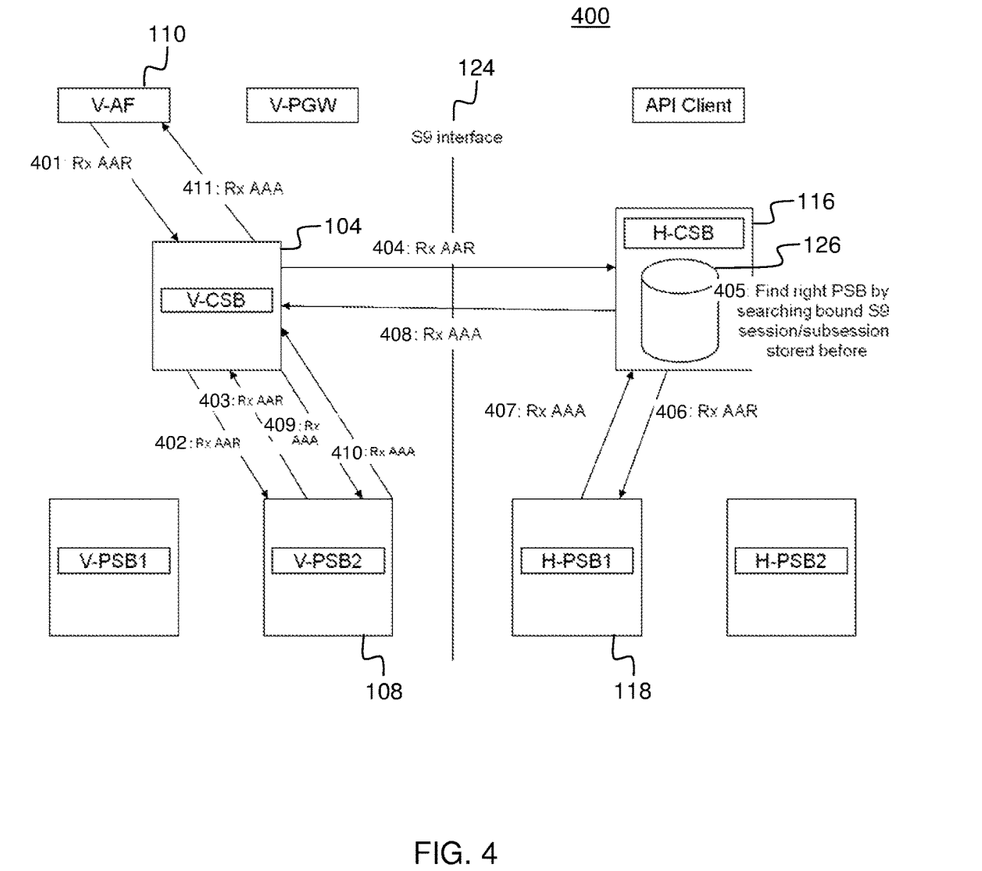
FIG. 4 illustrates an AF Session Destination selection message flow.

FIG. 4 illustrates an AF Session Destination selection message flow. When a Diameter session has been established at H-CSB 116 for a roaming subscriber as described with respect to FIG. 2, subsequent messages related to the same session can be routed to the appropriate H-PSB using the S9 data structure described with reference to FIG. 3. Following the message flow of FIG. 4, V-CSB 104 receives from V-PGW 112, a Diameter Rx Authorization Application Request (AAR) message 401 associated with a communication session for a roaming subscriber, as described with reference to FIG. 2. V-CSB 104 looks up the corresponding IPCAN session and then selects the associated PSB, in this case V-PSB2 108. V-CSB 104 then routes Rx AAR message 402 to V-PSB2 108 which returns Rx AAR message 403 to V-CSB 104 which then forwards as Rx AAR message 404 via S9 interface 124 to H-CSB 116. Because the original roaming session request came in with an S9 message, there no IPCAN session at H-CSB 116. Historically, an AF session is bound to an IPCAN session, not an S9 subsession. In the described scenario, H-CSB 116 does not have an IPCAN for the roaming subscriber, instead, the AF session is bound to an S9 subsession, with an index key 308 comprising the S9 session ID and the S9 subsession ID. H-CSB 116 uses the IPv4 address in the Rx message to look up the binding S9 subsession entry in the database 126 to find the PSB ID, shown as step 405. H-CSB 116 then routes the message as Rx AAR message 406 to H-PSB1 118. H-PSB1 118 resolves the policy control decisions and returns an Authorization Application Answer (AAA) as Rx AAA message 407 which is returned to H-CSB 116 which then forwards the message as Rx AAA message 408 to V-CSB 104 via S9 interface 124. V-CSB 104 then routes the message as Rx AAA message 409 to V-PSB2 108 which returns the message as Rx AAA message 410 to V-CSB 104 which then forwards it as Rx AAA message 411 to V-PGW 112.

For a subscriber roaming call, an IPCAN session is created on V-CSB 104 but not on H-CSB 116 and conversely, a subsession is created on H-CSB 116 but not V-CSB 104. This ensures that an AF session will not bind with both an IPCAN session and an S9 subsession at the same time on the same device.

Figure 5:
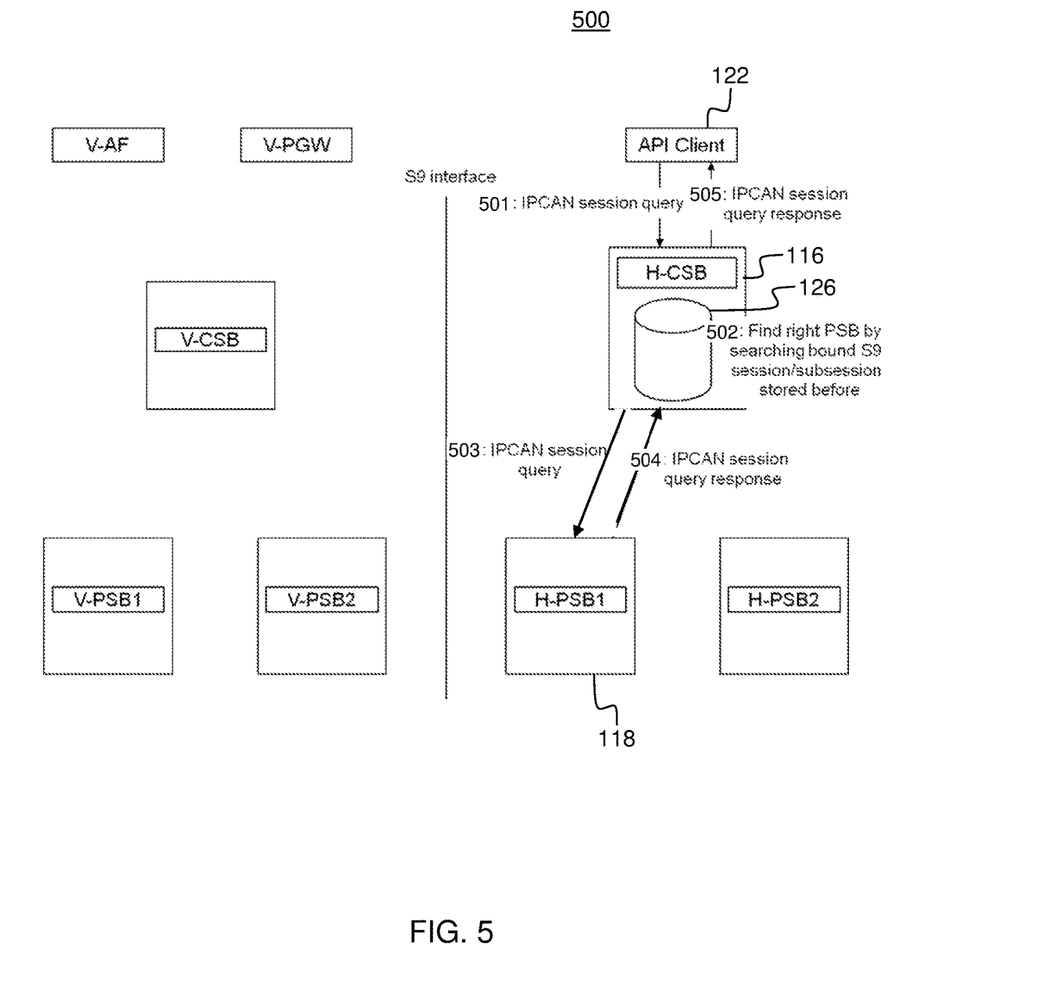
FIG. 5 illustrates an IPCAN session API destination selection message flow.

FIG. 5 illustrates an IPCAN session API destination selection message flow. When a Diameter session has been established at H-CSB 116 for a roaming subscriber as described with respect to FIG. 2, subsequent messages from the home network related to the same session can also be routed to the appropriate H-PSB using the S9 data structure described with reference to FIG. 3. Following the message flow of FIG. 5, API client 122 sends an IPCAN session query message 501 to H-CSB 116. Because the original roaming session request came in with an S9 message, there no IPCAN session at H-CSB 116. Because there is a one to one mapping between IPCAN session and S9 subsession, there is always one S9 subsession for the bound IPCAN session. Therefore, instead, H-CSB 116 uses the IPv4 address in the IPCAN session query message 501 to look up the binding S9 subsession entry in the database 126 to find the PSB ID, shown as step 502. H-CSB 116 then routes the message as IPCAN session query 503 to H-PSB1 118. H-PSB1 118 resolves the policy control action and returns IPCAN session query response message 504 to H-CSB 116 which then forwards it as IPCAN session query response message 505

Figure 6:
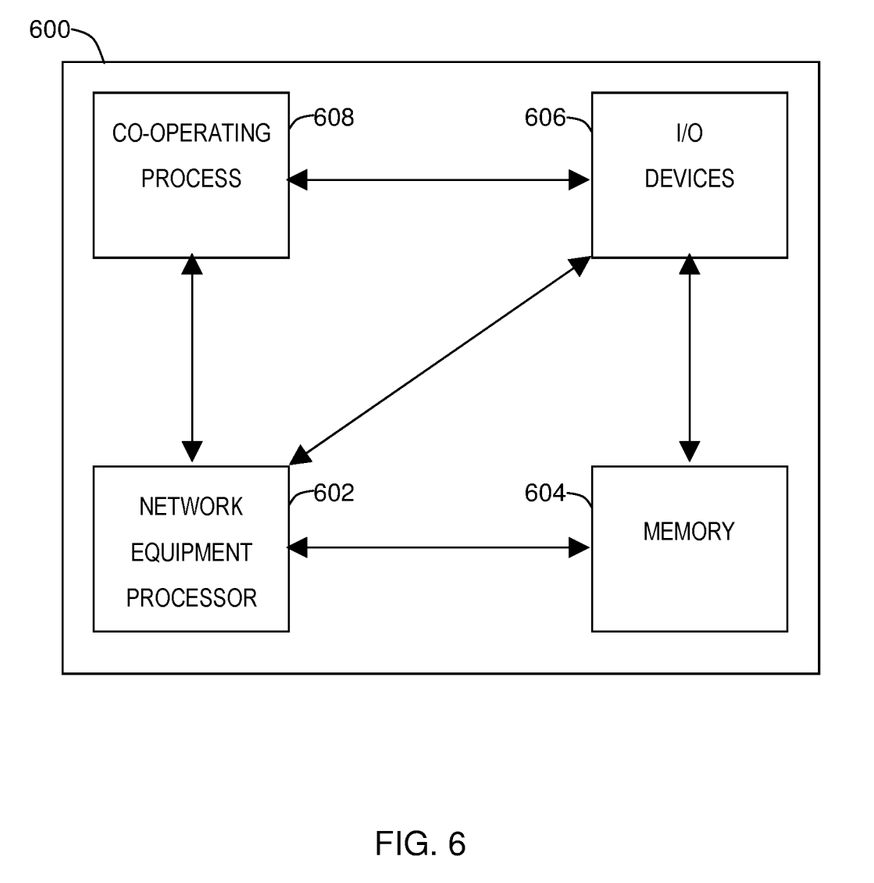
FIG. 6 illustrates a high-level block diagram of a network equipment processor assembly.

FIG. 6 depicts a high-level block diagram of a network equipment processor assembly suitable for use in performing functions described herein.

As depicted in FIG. 6, network equipment processor assembly 600 includes a network equipment processor element 602 (e.g., a central processing unit (CPU) and/or other suitable processor(s)), a memory 604 (e.g., random access memory (RAM), read only memory (ROM), and the like), a cooperating module/process 608, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 608 can be loaded into memory 604 and executed by network equipment processor 602 to implement the functions as discussed herein. As well, cooperating process 608 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. Numerous modifications, variations and adaptations may be made to the embodiment of the invention described above without departing from the scope of the invention, which is defined in the claims.

What is claimed is:

1. A method performed by a network node for creating a Diameter session, the method comprising:
    receiving an S9 session request message comprising an S9 session identifier (ID) and one or more subsession IDs and storing the S9 session ID and the one or more subsession IDs in a cluster mapping table; and
    for each said one or more subsession IDs, creating a Diameter session with a session ID comprising said S9 session ID and said respective S9 subsession ID.

2. The method of claim 1, further comprising adding information from said S9 session request message related to said respective S9 subsession ID, to said Diameter session.

3. The method of claim 2 wherein said information related to said respective S9 subsession ID comprises a first Internet Protocol (IP) address.

4. The method of claim 3, further comprising adding internal routing information related to said respective S9 subsession ID.

5. The method of claim 4, wherein said internal routing information is determined by said network node as function of said first IP address.

6. The method of claim 4, wherein:
    said network node comprises a policy and charging function node; and
    said internal routing information comprises an address for a policy server sub-system.

7. The method of claim 3, further comprising:
    receiving from an application function (AF) an AF request message comprising a second IP address; and
    associating said AF request message with the Diameter session having the corresponding IP address.

8. The method of claim 3, further comprising:
    receiving an IPCAN session query message comprising a second IP address; and
    associating said IPCAN session query message with the Diameter session having the corresponding IP address.

9. The method of claim 1, further comprising receiving an S9 subsession termination message; and
    terminating the Diameter session associated with the S9 subsession ID of said S9 subsession termination message.

10. The method of claim 1, further comprising receiving an S9 session termination message; and
    terminating all of the Diameter sessions associated with the S9 session ID of said S9 session termination message.

11. A tangible and non-transitory machine-readable storage medium encoded with instructions for execution by network node for creating a Diameter session, the tangible and non-transitory machine-readable storage medium comprises instructions for:
    receiving an S9 session request message comprising an S9 session identifier (ID) and one or more subsession IDs and storing the S9 session ID and the one or more subsession IDs in a cluster mapping table; and
    for each said one or more subsession IDs, creating a Diameter session with a session ID comprising said S9 session ID and said respective S9 subsession ID.

12. The tangible and non-transitory machine-readable storage medium of claim 11, further comprising instructions for adding information from said S9 session request message related to said respective S9 subsession ID, to said Diameter session.

13. The tangible and non-transitory machine-readable storage medium of claim 12, wherein said information related to said respective S9 subsession ID comprises a first Internet Protocol (IP) address.

14. The tangible and non-transitory machine-readable storage medium of claim 13, further comprising instructions for adding internal routing information related to said respective S9 subsession ID.

15. The tangible and non-transitory machine-readable storage medium of claim 14, wherein said internal routing information is determined by said network node as function of said first IP address.

16. The tangible and non-transitory machine-readable storage medium of claim 14, wherein:
    said network node comprises a policy and charging function node; and
    said internal routing information comprises an address for a policy server sub-system.

17. The tangible and non-transitory machine-readable storage medium of claim 13, further comprising instructions for:
    receiving from an application function (AF) an AF request message comprising a second IP address; and
    associating said AF request message with the Diameter session having the corresponding IP address.

18. The tangible and non-transitory machine-readable storage medium of claim 13, further comprising instructions for:
    receiving an IPCAN session query message comprising a second IP address; and
    associating said IPCAN session query message with the Diameter session having the corresponding IP address.

19. The tangible and non-transitory machine-readable storage medium of claim 11, further comprising instructions for:
    receiving an S9 subsession termination message; and
    terminating the Diameter session associated with the S9 subsession ID of said S9 subsession termination message.

20. The tangible and non-transitory machine-readable storage medium of claim 11, further comprising instructions for:
    receiving an S9 session termination message; and
    terminating all of the Diameter sessions associated with the S9 session ID of said S9 session termination message.

* * * * *